(12) United States Patent
Gross

(10) Patent No.: US 7,773,543 B2
(45) Date of Patent: Aug. 10, 2010

(54) DETERMINING CHARACTERISTICS OF NODE-TO-NODE NETWORK LINKS FROM FORWARDING TIME MEASUREMENTS

(75) Inventor: Kevin P. Gross, Boulder, CO (US)

(73) Assignee: Cirrus Logic, Inc., Austin, TX (US)

( * ) Notice: Subject to any disclaimer, the term of this patent is extended or adjusted under 35 U.S.C. 154(b) by 881 days.

(21) Appl. No.: 11/611,120

(22) Filed: Dec. 14, 2006

(65) Prior Publication Data

US 2008/0144534 A1 Jun. 19, 2008

(51) Int. Cl.
*H04L 12/28* (2006.01)
*H04L 12/54* (2006.01)
*H04J 3/06* (2006.01)
(52) U.S. Cl. .................. 370/257; 370/428; 370/503
(58) Field of Classification Search .................. None
See application file for complete search history.

(56) References Cited

U.S. PATENT DOCUMENTS

| 2005/0058081 | A1* | 3/2005 | Elliott | 370/252 |
| 2007/0189184 | A1* | 8/2007 | Ryu et al. | 370/252 |
| 2008/0031140 | A1* | 2/2008 | Suh et al. | 370/238 |

OTHER PUBLICATIONS

Huffaker, et al., "Topology Dicovery by Active Probing"; Symposium on Applications and the Internet, 2002; http://www.caida.org/home/www.caida.org/outreach/papers/2002/SkitterOverview/skitter_overview.pdf.

* cited by examiner

*Primary Examiner*—Chirag G Shah
*Assistant Examiner*—Srinivasa R Reddivalam
(74) *Attorney, Agent, or Firm*—Dan Shifrin

(57) ABSTRACT

A method is provided for determining the length of node-to-node links in a computer network. The method includes measuring the forwarding time for each node-to-node link in the network, eliminating queuing time from each forwarding time measurement, determining and subtracting store-forward time from each forwarding time measurement, determining and subtracting execution time from each forwarding time measurement to obtain a propagation time for a signal being transmitted on each node-to-node link and, based upon the propagation time for each node-to-node link, calculating a length of each node-to-node link. A network map may also be derived by identifying internal nodes in the network, translating each store-forward time into a hop count, constructing a connectivity map of the network including a connection map of internal nodes and superimposing the calculated link lengths onto the connectivity map to determine cable length between any internal nodes with more than two connections.

23 Claims, 8 Drawing Sheets

DETERMINING CHARACTERISTICS OF NODE-TO-NODE NETWORK LINKS FROM FORWARDING TIME MEASUREMENTS

TECHNICAL FIELD

The present invention relates generally to computer networks and, in particular, to determining the internal connections and lengths of node-to-node links within a network.

BACKGROUND ART

A digital network includes devices, each of which is logically coupled to each other device. As used herein, the term "couple" should not be interpreted as being limited only to direct connections between two nodes, devices or components (generically referred to as "elements") but may also refer to an indirect relationship in which two elements are separated by one or more intermediary elements such that a path exists between the two elements which includes the intermediary element(s). As represented in FIG. 1, when a network is operating, its topology, including what devices are physically connected to what other devices, what intervening devices are present and the lengths of connecting links, are hidden and not usually relevant. However, in some instances, it may be important to know such details. For example, a network map indicating the devices, the physical connections, link distances and intervening devices may be useful for network management, performance optimization and troubleshooting. A network map may also be useful in the context of digital rights management (DRM) to prevent dissemination of copyrighted material beyond the location for which it is licensed.

SUMMARY OF THE INVENTION

The present invention provides methods, system and a computer program product for determining the length of node-to-node links in a digital network. The method includes measuring the forwarding time for each node-to-node link in the network, eliminating queuing time from each forwarding time measurement, determining and subtracting store-forward time from each forwarding time measurement, determining and subtracting execution time from each forwarding time measurement to obtain a propagation time for a signal being transmitted on each node-to-node link and, based upon the propagation time for each node-to-node link, calculating a length of each node-to-node link. The calculated lengths may then be output to a user, such as by being displayed on a computer monitor or printed. A network map may also be derived by identifying internal nodes in the network, translating each store-forward time into a hop count, constructing a connectivity map of the network including a connection map of internal nodes and superimposing the calculated link lengths onto the connectivity map to determine cable length between any internal nodes with more than two connections.

The present invention may also provide a method for identifying possible unlicensed network nodes. A range within which a node in a network is assumed to be authorized is determined. The length of node-to-node links in the network is calculated and an indicator is given if a calculated length of a link is beyond the determined range.

DETAILED DESCRIPTION OF THE PREFERRED EMBODIMENT

Figure 1:
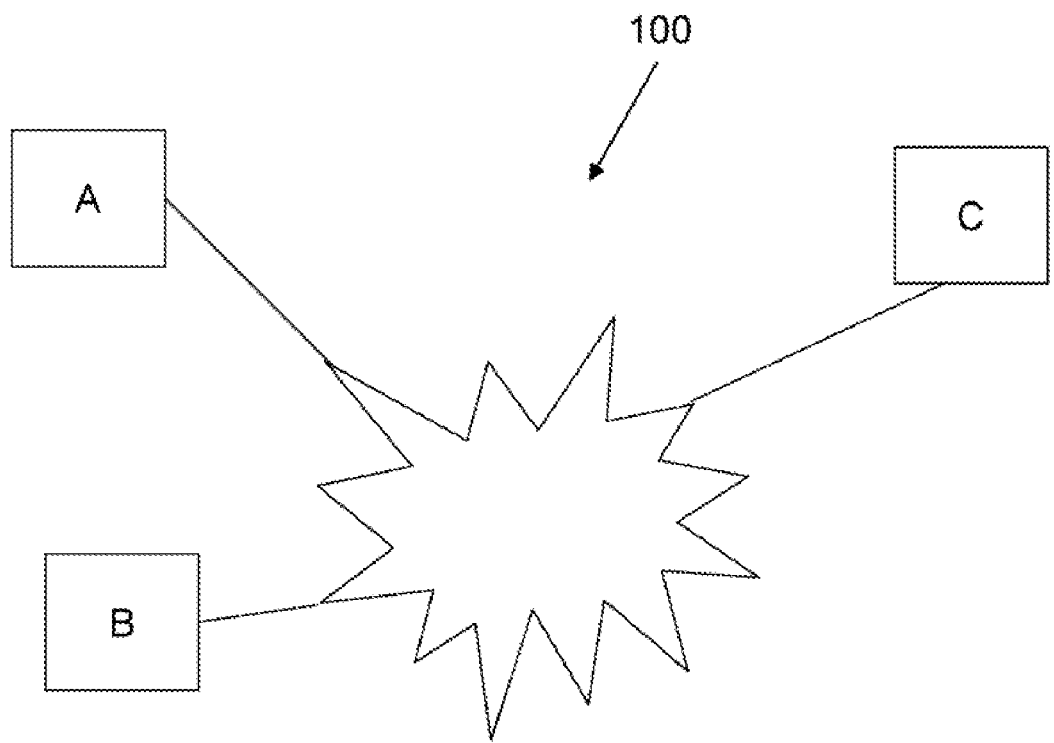
FIG. 1 illustrates a generic digital network.
Figure 2:
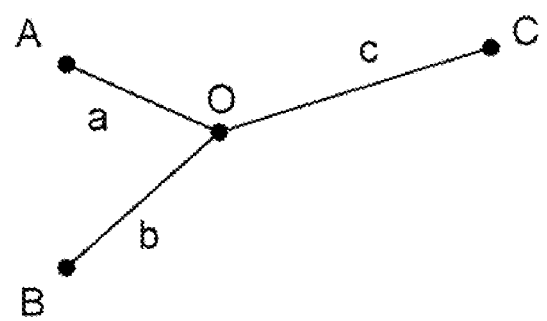
FIG. 2 illustrates one example of a configuration of network connections within the generic network of FIG. 1.

FIG. 1 illustrates a generic digital network 100 with three devices A, B, C. Although each device is logically coupled to each other device, it is not known how the inter-node connections are made through the network. FIG. 2 illustrates one possible configuration of such network connections having a common interconnecting node O. However, other configurations are possible. The link lengths a, b and c are not known.

The present invention provides methods and means based on forwarding time measurements for determining the internal configuration of a network and the lengths of internal and external links. Forwarding time is the time that it takes for a packet to transit from one point on a network to another point and includes four basic components: execution time, queuing time, propagation time, and store-forward time.

Execution time is the time required for a network to prepare a packet for transmission. Execution time is produced by the finite amount of time it takes to execute the data processing and queuing algorithms in an intermediate or end node.

If an outgoing channel is already busy processing and transmitting another packet when a new packet is presented for transmission, then processing and transmitting the new packet will be delayed until the transmission of the current packet is complete. This delay is the queuing time. In some cases there may be multiple packets already queued for transmission ahead of the presented packet.

Propagation speed in network media is constant and limited to the speed of light in the media. For CAT-5 cable, propagation speed is about 0.66 c or about 5 nanoseconds per meter. From the propagation time, the length of the link may be inferred.

Common data processing procedure in packet switched networks dictates that a received packet does not begin to be processed until all of the packet data has been received and a frame check sequence at the end of the packet verified. The resultant delay is the store-forward time and is proportional to the length of the packet. A store-forward delay occurs at the final destination as well as at each intermediate device along the path from transmitter to receiver.

Figure 3:
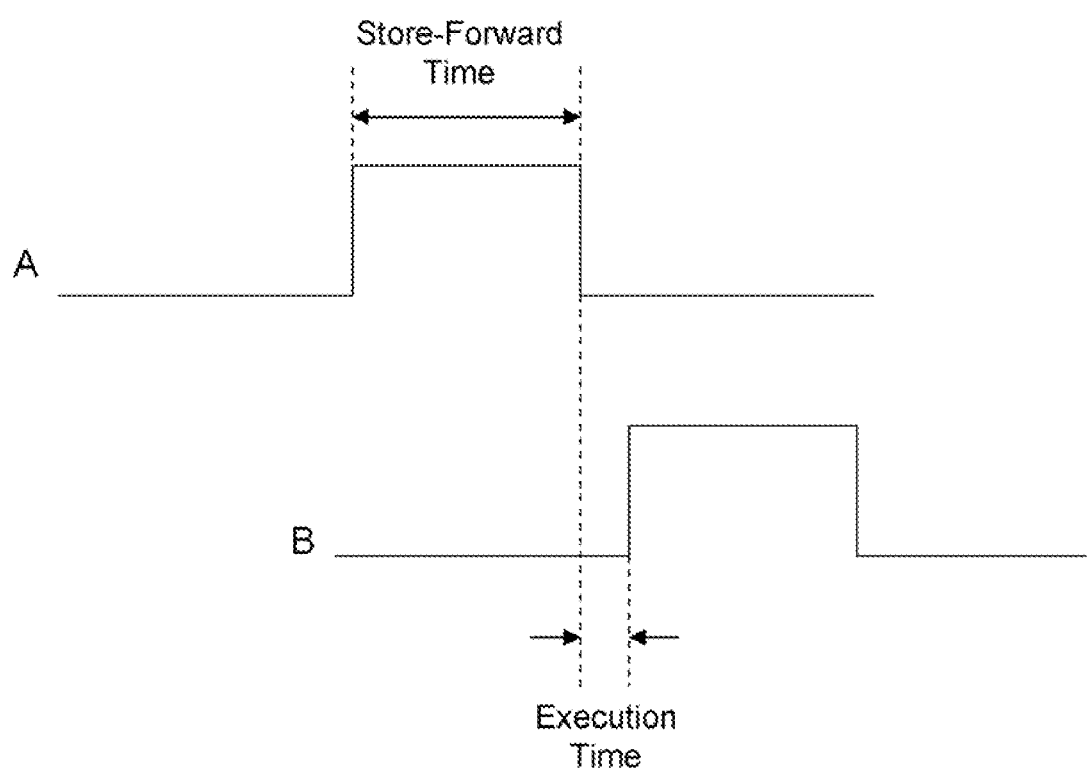
FIG. 3 is a plot of the transmission of a packet through a two-port router, illustrating store-forward and execution times.

FIG. 3 is a plot illustrating the execution and store-forward times of a packet passing through a two-port router Measuring the forwarding time is typically accomplished by measuring the round-trip time required to transmit a request from an initiating device to a remote server and to receive a response back from remote server. The time interval measured comprises forwarding time in both directions plus any time taken for the remote server to recognize the request and generate the response.

Forwarding time can be derived by subtracting the remote server response time from these measurements and dividing the result in half, reasonably assuming that forwarding time is symmetrical (the same in each direction of travel), that the server has accurately reported its response time and that transmit and receipt times can be accurately measured at the initiator.

Forwarding time measurements may be performed as a dedicated exchange or may be performed by timing exchanges already occurring on the network. Timing information may be communicated as data in the packets being timed or may be communicated later in separate, follow-up exchanges.

Figure 4:
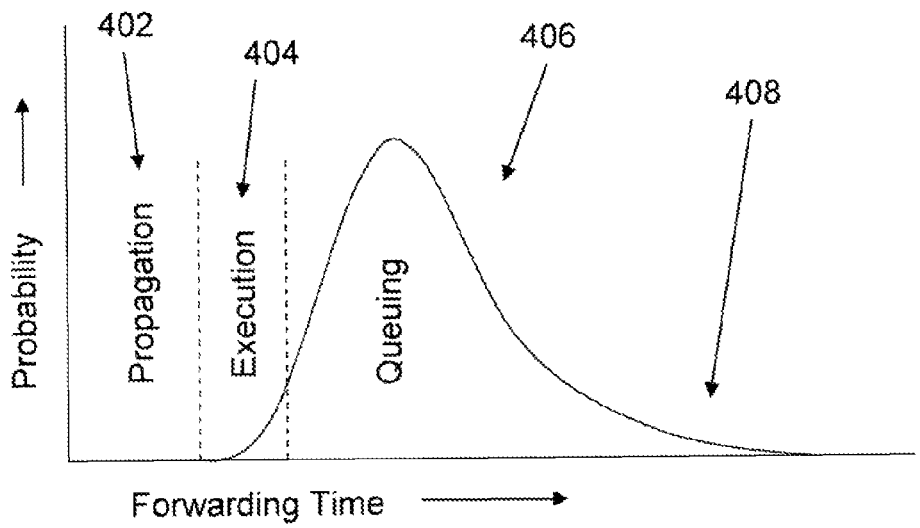
FIG. 4 is a representative plot of forwarding time probability distribution for a typical path through the network.

FIG. 4 is a plot of the forwarding time distribution for a single link in a network. The first section of the plot shows a quiet period in which no packets are received with a forwarding time less than the propagation time plus store-forward time. The quiet period continues in the second section in which almost no packets are received during the execution time. A small variation in execution time gives a few packets a head start. The third section shows forwarding time distribution due to queuing delays. In this particular example, a good portion of the packets were not affected by a queuing delay and are forwarded immediately once propagation and execution times have passed. The tail of the forwarding time distribution plot represents queuing delays caused by other network traffic congesting the link. The amount of queuing delay varies depending on the size and progress of transmissions queued ahead of the packet under measurement. The upper bound on queuing delays can be quite large if multiple packets are queued ahead of the packet under measurement.

Once the overall forwarding time is determined for a link, the execution, queuing, store-forward and propagation time components are isolated and removed Queuing delay may be determined by the fact that, even on a loaded network, queues may be empty during some exchanges; the network may be momentarily quiet along the path being measured and thus no queuing delays are experienced. If sufficient measurements are taken, it can be reasonably assured that the lowest forwarding measurement represents an instance in which no queuing delays were experienced. Once determined, the queuing time may be eliminated or removed by subtracting it from the forwarding time.

Figure 5:
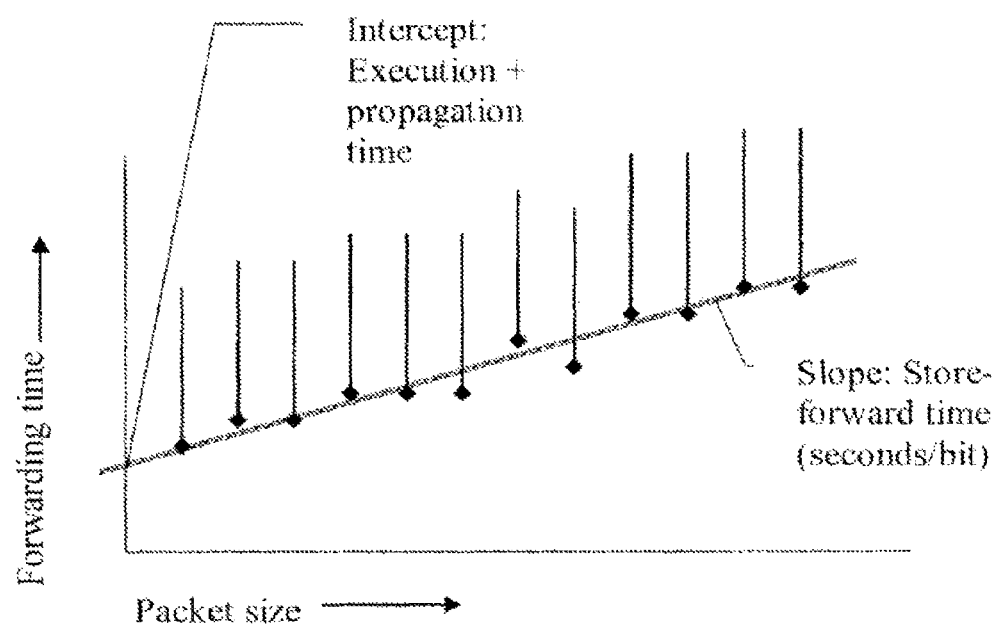
FIG. 5 is a representative plot of forwarding time relative to packet size.

Store-forward time may be quantified separately because it is proportional to packet size. By varying packet sizes used in the forwarding time measurements, a profile of forwarding time versus packet size is generated. After removing queuing time by choosing the shortest measurement for each packet size, as described above, a linear regression on the dataset may be performed. When the results are plotted (FIG. 5), the store-forward time is identified as the slope and the execution time plus propagation time is identified as the y-intercept.

Figure 6:
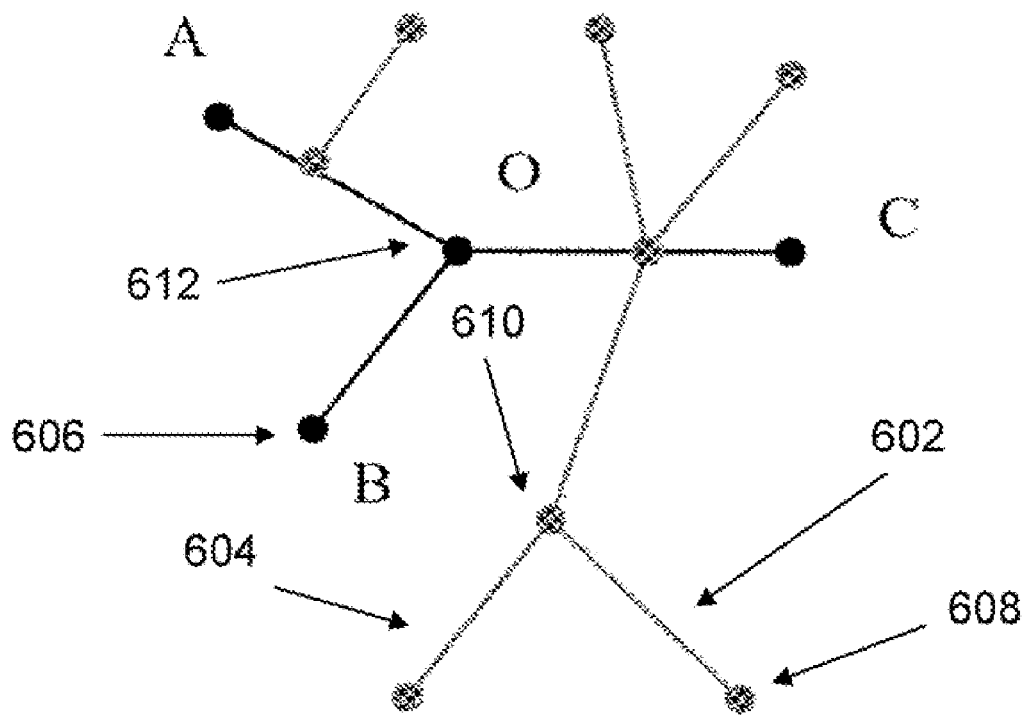
FIG. 6 is an illustration of a representative spanning tree network configuration.
Figure 7:
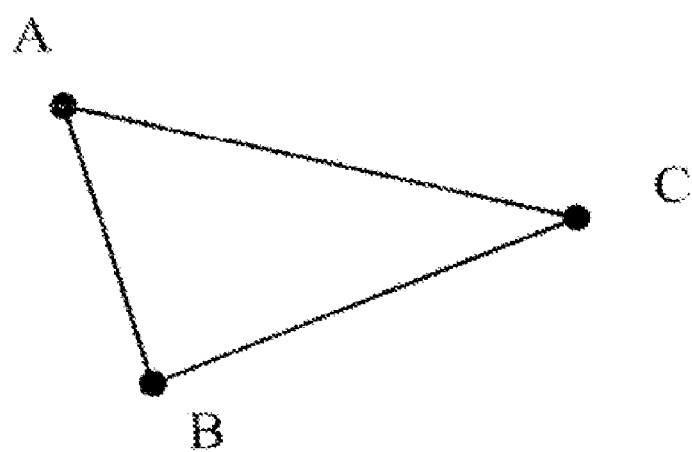
FIG. 7 illustrates a simple, three-device network.

Next, the internal nodes or junctions of the network are identified. The simple network represented in FIG. 7 has three devices or nodes A, B and C. Store-forward times between each pair of nodes is measured as: AB, AC, BC which respectively represent the times between nodes A and B, nodes A and C, and nodes B and C. Solving simultaneous equations produces a transformation that exposes and indicates the position of an internal node O which serves as a common measured store-forward times to a network map is performed as follows:

$$a=(AB-BC+AC)/2$$

$$b=(BC-AC+AB)/2$$

$$c=(AC-AB+BC)/2$$

where a, b and c represent independent store-forward times to the presumed common internal node O. A transformation can result in one of the derived store-forward times being zero. This situation indicates that the internal node O is coincident with the leaf respective node: the internal node does not exist. Rather, data passes through the node to reach the other nodes The derived topology for the three nodes is a subset of an overall network potentially containing additional nodes (FIG. 6). The derived store-forward times may be used to infer additional intervening nodes. However, if store-forward times at all nodes on the network can be measured, as will be described, such inferences become unnecessary.

Ethernet and other local area networks are constructed topologically as spanning trees. A spanning tree implies the existence of a single path through the network from any point on the network to any other point. The store-forward time derived as the slope of the linear regression of forwarding time measurements is given in units of seconds per bit. The store-forward time characterizes the intervening nodes in the path taken between pairs of nodes. It is possible to characterize the connectivity and internal structure of a network based on analysis of store-forward times between all paired combinations of leaf nodes.

In one embodiment, the connectivity map is built by choosing two leaf nodes A and B and a third leaf node C. Store-forward times a and b to an assumed common interior node O are computed. A new third leaf node C' is chosen and store-forward times a' and b' are computed for this scenario, representing new store-forward times to the assumed common interior node O. If all possible choices for C result in the same computed values for a and b, nodes A and B are then known to share a common immediate parent. This process is then repeated until all pairs are identified. A pair of pairs that shares a common member (i.e. AB, BC) can then be coalesced into a triplet with common parent (i.e. ABC) and so on. At this stage, there may be disconnected leaf nodes and sets of leaf nodes known to have a common parent. The process is then repeated, treating the sets of leaf nodes as a single leaf node. Iterating in this way builds the connectivity map from the outside inwards. After the final iteration, a single leaf node (set) remains, thus indicating that all connections have been made.

Figure 8A:
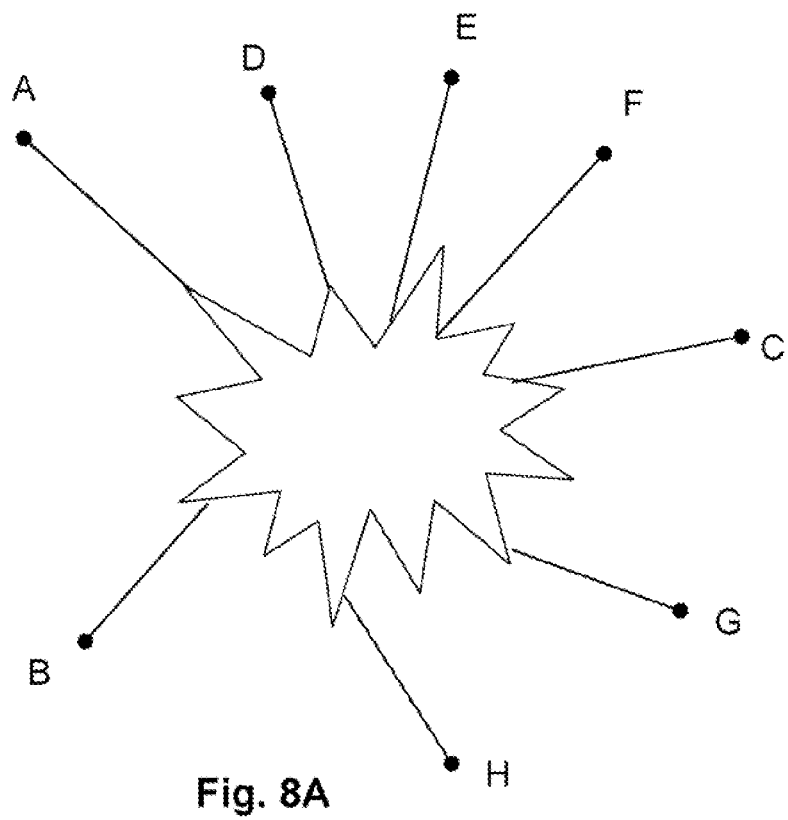
FIGS. 8A-8C illustrate a process for building a connectivity map of network nodes.
Figure 8B:
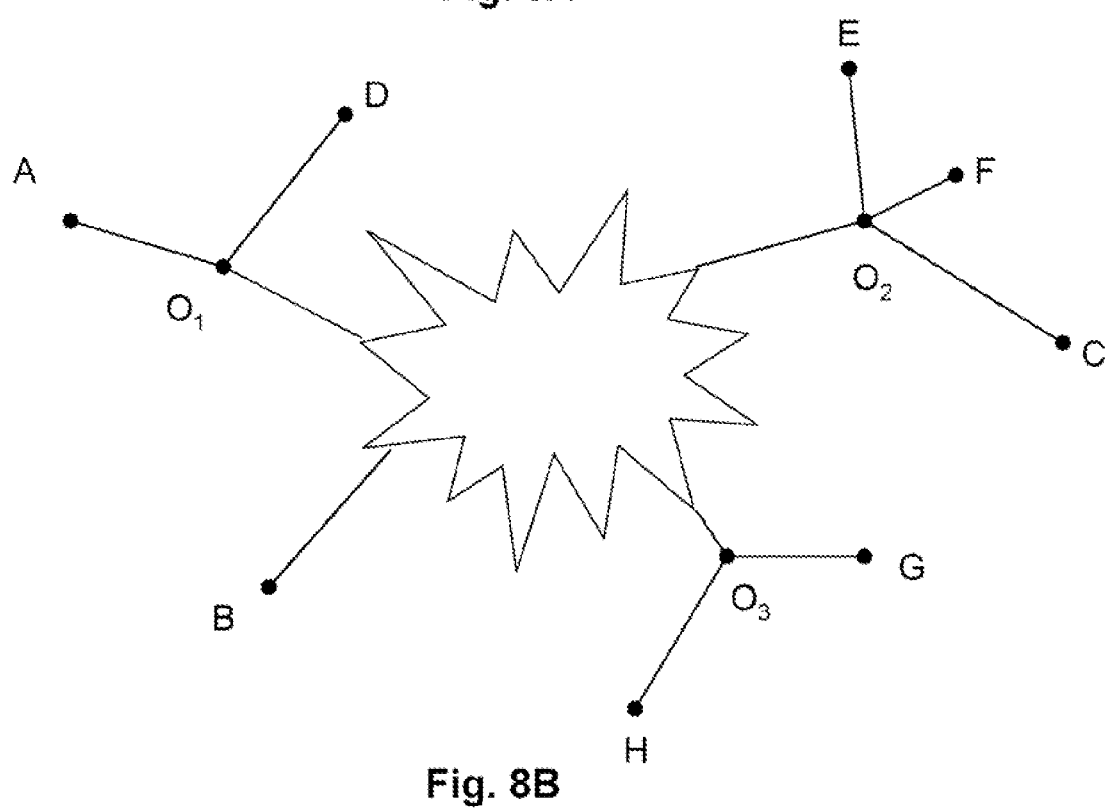
Figure 8C:
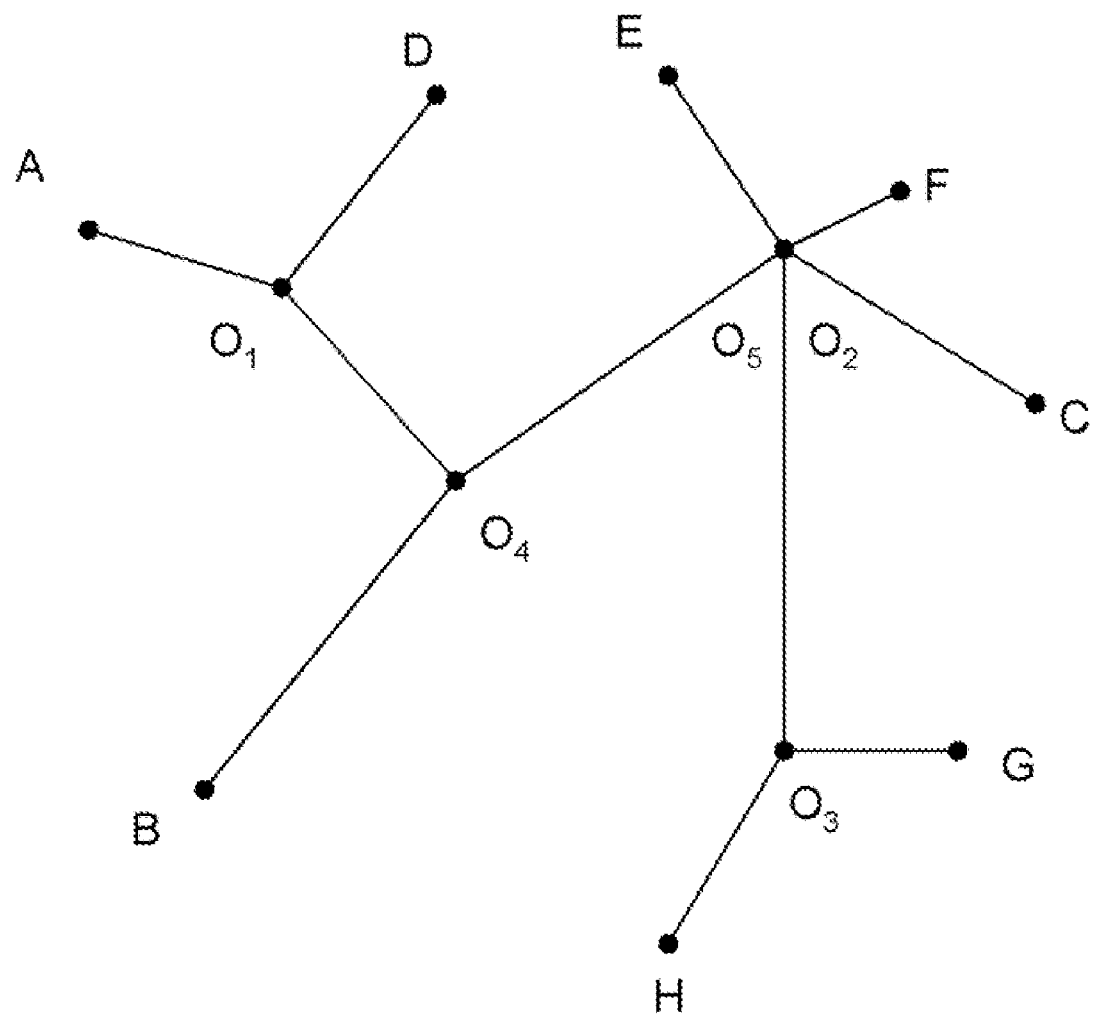

An example of building a connectivity map is illustrated in FIGS. 8A-8C. A first leaf node pair AB is selected (FIG. 5A). Store-forward times a and b are then computed using node C as a reference third leaf. After choosing node D as a third leaf node, store-forward times a' and b' are calculated, again representing new store-forward times to the assumed common interior node O. If a'≠a or b'≠b, then nodes A and B do not share a common parent. The process is then repeated with leaf node pair AC. Assume for this example that no common parent is found with this leaf node pair either. Assume now, however, that when the leaf node pair AD is selected, a=a' and d=d' for any third leaf node selected. This condition indicates that A and D share a common parent. If this process is continued (FIGS. 8A-8C), then the nodes in the following pairs are, for this example, found to have a common parent: AD, EF, FC, HG. Pairs EF and FC may be coalesced to a triplet EFC. Node B cannot be paired with any other leaf node. A second iteration of the process is performed, considering AD, EFC, HG and B as the new leaves. The full process of the iterative solution is diagramed in FIGS. 8A-8C. In the final iteration (FIG. 8C), EFG and HG are determined to have a common parent at node $O_5$. The derivations, however, indicate a store-forward time of zero between node $O_5$ and previously discovered node $O_2$. Thus, node $O_5$ is coincident with node $O_2$ and is removed from the topology.

Figure 9:
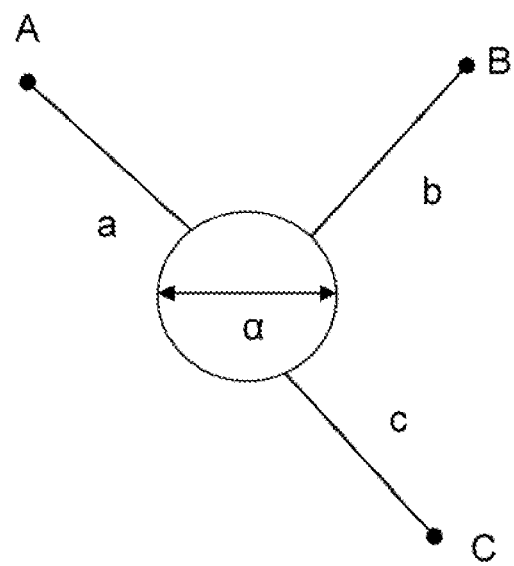
FIG. 9 illustrates the model of execution time and derivation of execution time from forwarding time measurements.

An accurate measure of propagation time allows the computation of cable lengths between nodes and contributes to a complete map of the network including topology and distances. The forwarding time measurements made between three or more devices connected at a common junction (FIG. 9) produces a set of simultaneous equations. This system of equations allows the removal of execution time a from propagation time and a determination of the relative distances between devices.

$$AB = a + b + \alpha$$

$$AC = a + c + \alpha$$

$$BC = b + c + \alpha$$

Therefore:

$$\alpha = AC + AB - BC - 2a$$

The solution for execution time α shows that knowing the actual distance for the connection to any one of these devices (in this example, the length of the connection from A to O), allows calibration of the measurements and solving for execution time for the internal connection and propagation time for each individual link.

One way of assuring that the distance to one device is known is to integrate a forwarding time measurement agent device into the network equipment. The distance of the connection to this device will be zero. Managed switches feature an integrated device which may be communicated with for the purpose of configuring and monitoring switch operation. Adding forwarding time measurement capability to such an integrated device may be done at minimal expense.

Propagation time measurements between nodes provide a measure of cable length through each path. Superimposing the length specifications on a reconstructed graph of the network permits a determination to be made of the cable length between any internal network nodes as well as for the connections to leaf nodes.

While calculating the link lengths is important, it is also important that the calculations be accurate. Based on the propagation speed of signals in network cabling and fiber optics, each 5 ns of uncertainty in propagation time results in approximately 1 meter of uncertainty in distance. Several factors are relevant to accuracy. Quantization occurs in packet time stamping on both sides of a link. Conventionally, quantization error is removed by averaging numerous measurements over time. In the present invention, such error removal is not feasible due to the desire to instead take minimum measurements over time so as to remove any queuing time from the measurements. Instead, in the present invention, a different kind of averaging, linear regression, is used to filter out the quantization error over multiple kinds of measurements. Packet timestamps are quantized to the resolution of the clock at the transmitter or receiver. By performing numerous measurements over a range of forwarding delays the quantization error is decorrelated from the measurements. Consolidating measurements through linear regression filters out the quantization error and improves accuracy. The highest accuracy is obtained by using the highest number of packet size measurements. Ethernet packet size may vary from 60 to 1518 octets, yielding a possible 1458 measurement points.

A loaded link will spend more of its time in the active state forwarding packets. However, it is desirable to make the round-trip forwarding time measurements with the network in an idle state. This process may be performed by taking multiple measurements over time and identifying the measurements with the shortest forwarding times. The number of measurements required to be assured of having taken a measurement without a queuing delay increases with increased networking loading and number of switch hops between measurement nodes.

Similar to the issue of queuing delay statistics, the number of measurements required to be assured of an accurate base execution time measurement is dependent on loading of the execution unit(s) and the number of switch hops between the nodes being measured. The number of measurements required to be assured of simultaneously measuring minimum queuing time and execution time is the product of the independent measurement assurance numbers for the two cases.

Figure 10:
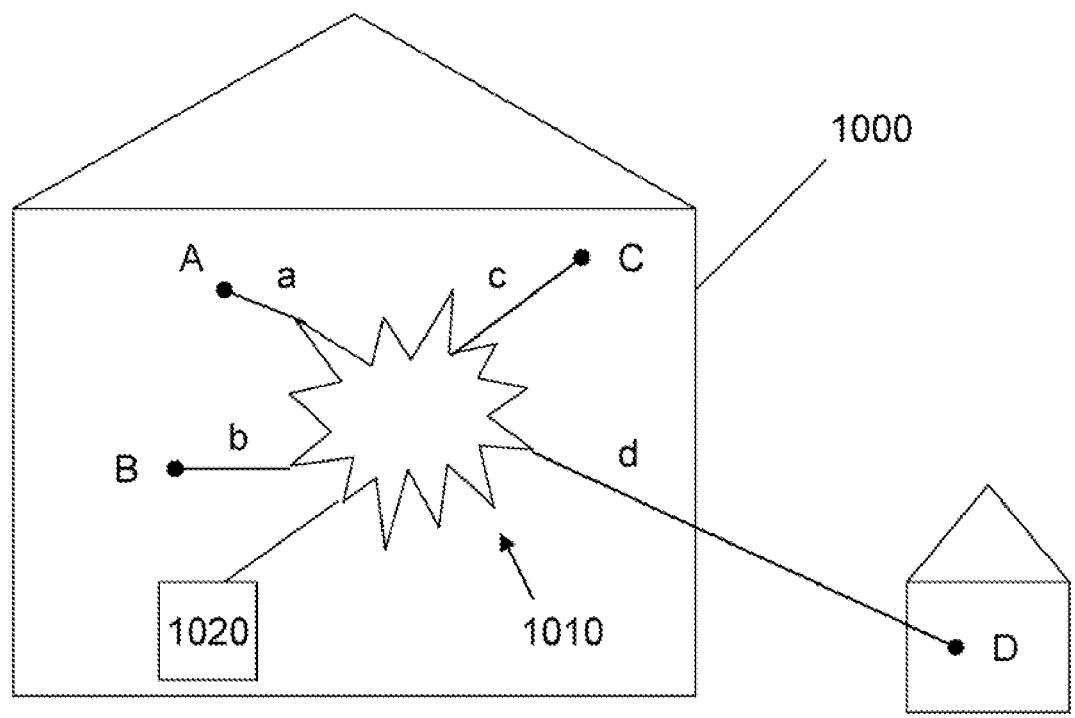
FIG. 10 illustrates a use of the present invention to determine whether a network node is outside of a predetermined range and, therefore, may possibly be an unlicensed node for DRM purposes.

In one embodiment of the present invention, illustrated in FIG. 10, the calculation of intermediate node counts and respective node-to-node link lengths may be used to make a determination of whether a node is within a predetermined distance or range of the rest of the network. For example, under digital rights management (DRM) rules, a licensed user may play back a licensed song anywhere in his home 1000 via his home network 1010. Until the present invention, it was difficult to determine if a particular node, such as nodes A, B and C on the network was actually within the licensed user's home 1000 or if, instead, the network 1010 had been extended beyond the home, such as to node D. In accordance with the present invention, each calculated link length a, b, c, d may be compared with a predetermined distance, representing a reasonable scope for a home network. If the length, such as length d, of a link to the receiving node, such as node D, exceeds the predetermined distance, an indicator may be provided to a user, such as by being displayed on a monitor or printed on a printer. Alternatively, the media server 1020 may choose not to stream the media to the node D.

Figure 11:
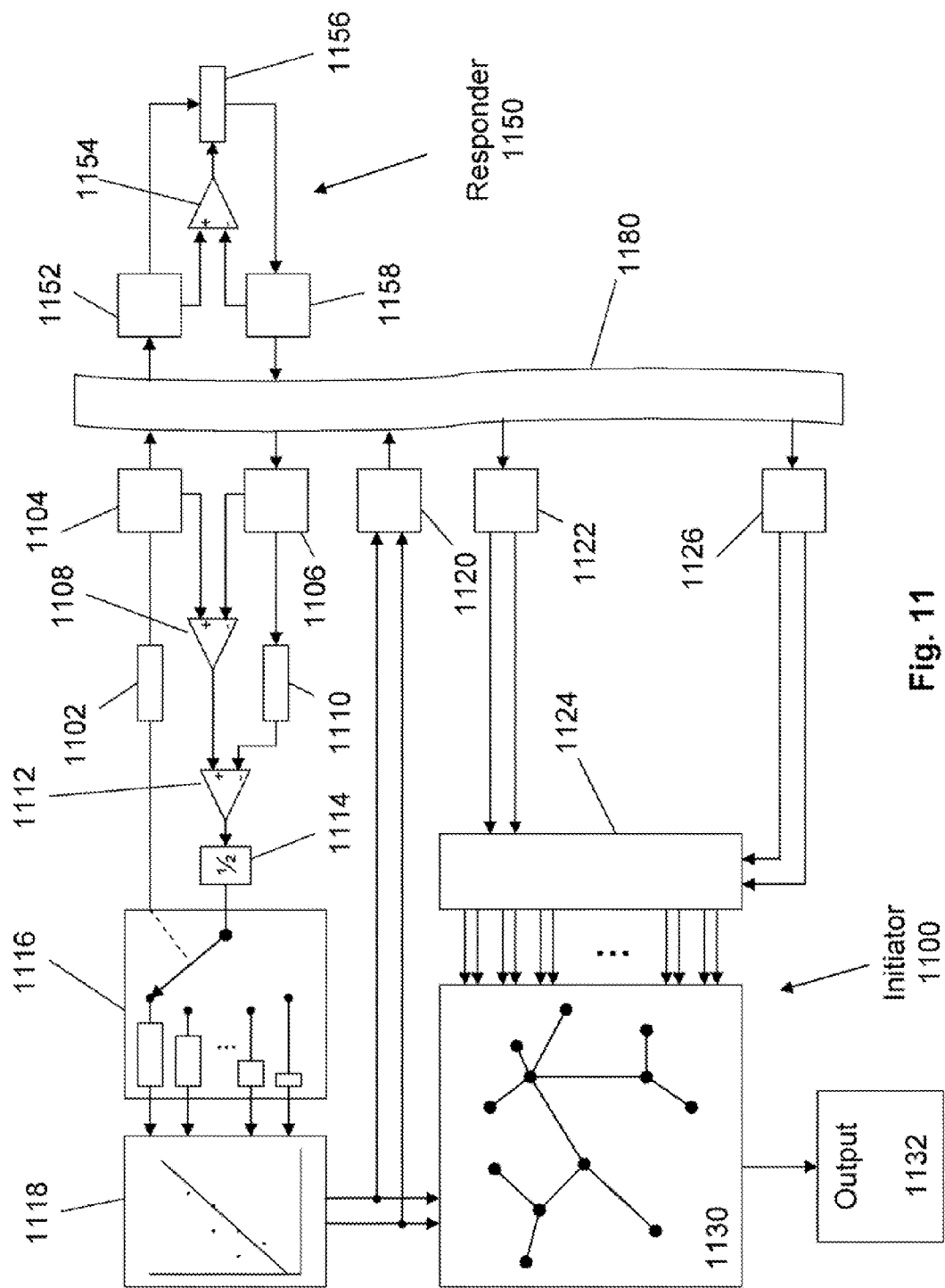
FIG. 11 is an operational diagram of an example of an initiator and of a responder of the present invention.

FIG. 11 is an operational diagram of an example of an initiator 1100 and of a responder 1150 of the present invention, coupled to a network 1180. As will be appreciated, there will be many initiators and many responders connected through the network. Additionally, a single device may include both an initiator and a responder. In operation, a measurement request module 1102 in the initiator 1100 generates timing measurement requests (or packets) of varying sizes at scheduled intervals. A transmitter 1104 adds a timestamp to each message and transmits them onto a network 1180. In a responder 1150, a receiver 1152 receives and timestamps the measurement request packets. A subtractor 1154 determines the local turnaround time between receipt of a request and the transmission of a response. Subsequently, a reformatter 1156 reformats the request message as a response message and inserts the local turnaround time. A transmitter 1158 then timestamps the response packet and transmits it back onto the network 1180.

In the initiator 1100, a receiver 1106 receives and timestamps the measurement response packet from the responder 1150. A subtractor 1108 computes the request response time and a forwarding time module 1110 retrieves the turnaround time inserted at the responder 1150. A subtractor 1112 removes the turnaround time from the response time to generate a bi-directional forwarding time. Because, the round trip transmission is assumed to be symmetrical, the bi-directional forwarding time is divided in half in a divider 1114. The minimum forwarding time for each measurement packet size is computed in a module 1116 and is sent on to the regression module 1118 which performs a first-order linear regression on the measurement data set. As described above, the slope of the resulting plot represents the store-forward time (hop count) and the y-intercept represents the propagation plus execution time.

A transmitter 1120 transmits the measurement results to other devices on the network 1180 to enable the other devices to build their own network maps. In a like manner, a receiver 1122 receives measurement results from other devices on the network 1180 and stores these in local dataset 1124.

Another receiver 1126 receives measurement results from a reference device with a known or zero link length to its nearest neighbor device. Such a reference permits the calibration of other measurements and the removal of the execution time component.

Finally, a mapping module 1130 constructs a network map from the local, remote and reference measurements. The map may be presented as an output 1132 to a user, such as by being displayed on a monitor or printed on a printer.

While the present invention has been described in the context of a fully functioning data processing system, those of ordinary skill in the art will appreciate that the processes of the present invention are capable of being implemented in hardware, software or a combination of the two, and of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for determining the length of node-to-node links in a computer network.

What is claimed is:

1. A method for determining the length of node-to-node links in a digital network, comprising:
    measuring a forwarding time by a device for each node-to-node link;
    eliminating queuing time from each forwarding time measurement;
    determining and subtracting a store-forward time from each forwarding time measurement by:
        transmitting a first data packet having a first size over a link to a target node;
        measuring the forwarding time for the link;
        repeating the transmitting and measuring steps for a plurality of data packets having the first size;
        repeating the transmitting, measuring and repeating steps for a plurality of other data packets having a like plurality of other sizes;
        for each packet size, identifying the forwarding time with the lowest value as representing a forwarding time measurement for the link without a queuing time contribution;
        plotting a linear regression on a data set comprising the forwarding time as a function of packet size; and
        identifying the store-forward time as the slope of the plotted linear regression;
    determining and subtracting an execution time from each forwarding time measurement to obtain a propagation time for a signal being transmitted on each node-to-node link;
    based upon the propagation time for each node-to-node link, calculating a length of each node-to-node link; and
    outputting the calculated lengths to a user.

2. The method of claim 1, wherein measuring the forwarding time for each node-to-node link comprises:
    transmitting a data packet to a target node over a node-to-node link;
    measuring the time to receive an acknowledgement from the target node;
    subtracting a node response time from the measured time; and
    dividing the difference in half.

3. The method of claim 2, wherein transmitting the data packet to the target node comprises generating and transmitting a dedicated data packet.

4. The method of claim 2, wherein transmitting the data packet to the target node comprises transmitting an existing data packet.

5. The method of claim 1, wherein eliminating the queuing time contribution to forwarding time measurements comprises:
    performing multiple forwarding time measurements for a link; and
    identifying the forwarding time with the lowest value as representing a forwarding time measurement for the link without a queuing time contribution.

6. The method of claim 1, wherein determining the execution time comprises:
    measuring the forwarding time between a pair of devices in the network for which an actual distance between the pair of devices is known;
    eliminating queuing delay from the forwarding time;
    determining and subtracting the store-forward time from the forwarding time;
    calculating a propagation time based on a known length and physical properties of a cable connecting the pair of devices;
    subtracting the propagation time from the forwarding time;
    wherein the remaining forwarding time is attributable to execution time.

7. The method of claim 6, further comprising selecting a pair of devices having an inter-device distance equal to zero such that forwarding time less the queuing time less the store-forward time equals the execution time.

8. The method of claim 1, further comprising:
    identifying internal nodes in the network; and
    constructing a connectivity map of the network including a connection map of internal nodes based on store-forward times between nodes.

9. A method for identifying possible unlicensed network nodes, comprising:
    determining a range within which a node in a digital network is assumed to be authorized;
    measuring a forwarding time by a device for each node-to-node link in the network;
    eliminating a queuing time from each forwarding time measurement;
    determining and subtracting a store-forward time from each forwarding time measurement by:
        transmitting a first data packet having a first size over a link to a target node;
        measuring the forwarding time for the link;
        repeating the transmitting and measuring steps for a plurality of data packets having the first size;
        repeating the transmitting, measuring and repeating steps for a plurality of other data packets having a like plurality of other sizes;
        for each packet size, identifying the forwarding time with the lowest value as representing a forwarding time measurement for the link without queuing time contribution;
        plotting a linear regression on a data set comprising the forwarding time for each packet size; and
        identifying the store-forward time as the slope of the plotted linear regression;
    determining and subtracting an execution time from each forwarding time measurement to obtain a propagation time for a signal being transmitted on each node-to-node link; and based upon the propagation time for each node-to-node link, calculating a length of each node-to-node link; and providing an indicator that a calculated length link is beyond the determined range.

10. The method of claim 9, wherein measuring the forwarding time for each node-to-node link comprises:
transmitting a data packet to a target node over a node-to-node link;
measuring the time to receive an acknowledgement from the target node;
subtracting a node response time measured at the target node from the measured time to obtain a difference; and
dividing the difference in half.

11. The method of claim 10, wherein forwarding time measurements are performed on a dedicated data packet.

12. The method of claim 10, wherein forwarding time measurements are performed on existing data packets on the network.

13. The method of claim 9, wherein eliminating the queuing time comprises:
measuring a predetermined number of forwarding times for a link; and
identifying the forwarding time with the lowest value as representing a forwarding time measurement for the link without a queuing time contribution.

14. The method of claim 9, wherein determining the execution time comprises:
measuring the forwarding time between a pair of devices in the network for which an actual distance between the pair of devices is known;
eliminating a queuing delay from the forwarding time;
determining and subtracting a store-forward time from the forwarding time;
calculating a propagation time based on a known length and physical properties of a cable connecting the pair of devices;
subtracting the propagation time from the forwarding time;
wherein the remaining forwarding time is attributable to execution time.

15. The method of claim 14, further comprising selecting a pair of devices having an inter-device distance equal to zero such that the forwarding time less the queuing time less the store-forward time equals the execution time.

16. A computer program product comprising a non-transitory computer readable storage medium usable with a programmable computer, the computer program product having computer-readable code embodied therein for determining the length of node-to-node links in a digital network, the computer-readable code comprising instructions for:
measuring a forwarding time by a device for each node-to-node link;
eliminating a queuing time from each forwarding time measurement;
determining and subtracting a store-forward time from each forwarding time measurement by:
transmitting a first data packet having a first size over a link to a target node;
measuring the forwarding time for the link;
repeating the transmitting and measuring steps for a plurality of data packets having the first size;
repeating the transmitting, measuring and repeating steps for a plurality of other data packets having a like plurality of other sizes;
for each packet size, identifying the forwarding time with the lowest value as representing a forwarding time measurement for the link without a queuing time contribution;
plotting a linear regression on a data set comprising the forwarding time as a function of packet size; and
identifying the store-forward time as the slope of the plotted linear regression;
determining and subtracting an execution time from each forwarding time measurement to obtain a propagation time for a signal being transmitted on each node-to-node link; and
based upon the propagation time for each node-to-node link, calculating a length of each node-to-node link; and
outputting the calculated lengths to a user.

17. The computer program product of claim 16, wherein the instructions for measuring the forwarding time for each node-to-node link comprise instructions for:
transmitting a data packet to a target node over a node-to-node link;
measuring the time to receive an acknowledgement from the target node;
subtracting a node response time from the measured time; and
dividing the difference in half.

18. The computer program product of claim 17, wherein the instructions for transmitting the data packet to the target node comprise instructions for generating and transmitting a dedicated data packet.

19. The computer program product of claim 17, wherein the instructions for transmitting the data packet to the target node comprise instructions for transmitting an existing data packet.

20. The computer program product of claim 16, wherein the instructions for eliminating the queuing time comprise instructions for:
measuring a predetermined number of forwarding times for a link; and
identifying the forwarding time with the lowest value as representing a forwarding time measurement for the link without a queuing time contribution.

21. The computer program product of claim 16, wherein the instructions for determining the execution time comprise instructions for:
measuring the forwarding time between all pairs of devices in the network for which an actual distance between the pair of devices is known;
eliminating the queuing delay from the forwarding time;
determining and subtracting the store-forward time from the forwarding time;
calculating a propagation time based on a known length and physical properties of a cable connecting the pair of devices;
subtracting the propagation time from the forwarding time;
wherein the remaining forwarding time is attributable to the execution time.

22. The computer program product of claim 21, wherein the computer-readable code further comprises instructions for selecting a pair of devices having an inter-device distance equal to zero such that the forwarding time less the queuing time less the store-forward time equals the execution time.

23. The computer program product of claim 16, wherein the computer-readable code further comprises instructions for:
identifying internal nodes in the network; and
constructing a connectivity map of the network including a connection map of internal nodes based on store-forward times between nodes.

* * * * *